US010464780B2

(12) United States Patent
Wheeler et al.

(10) Patent No.: US 10,464,780 B2
(45) Date of Patent: Nov. 5, 2019

(54) TETHER LOCK

(71) Applicant: Mobile Tech, Inc., Lake Oswego, OR (US)

(72) Inventors: Wade Wheeler, Hillsboro, OR (US); Eric Charlesworth, Hillsboro, OR (US)

(73) Assignee: MOBILE TECH, INC., Lake Oswego, OR (US)

( * ) Notice: Subject to any disclaimer, the term of this patent is extended or adjusted under 35 U.S.C. 154(b) by 456 days.

(21) Appl. No.: 14/963,129

(22) Filed: Dec. 8, 2015

(65) Prior Publication Data

US 2016/0159611 A1    Jun. 9, 2016

Related U.S. Application Data

(60) Provisional application No. 62/089,760, filed on Dec. 9, 2014.

(51) Int. Cl.
| | | |
|---|---|---|
| *B65H 75/44* | (2006.01) | |
| *A47F 7/024* | (2006.01) | |
| *E05B 73/00* | (2006.01) | |
| *F16M 11/04* | (2006.01) | |
| *F16M 13/00* | (2006.01) | |

(52) U.S. Cl.
CPC ......... *B65H 75/4431* (2013.01); *A47F 7/024* (2013.01); *E05B 73/0011* (2013.01); *F16M 11/04* (2013.01); *F16M 13/00* (2013.01)

(58) Field of Classification Search
CPC ............ B65H 75/4418; B65H 75/4428; B65H 75/4431; E05B 73/0011; F16M 11/043; A47F 7/024; A01K 27/004
See application file for complete search history.

(56) References Cited

U.S. PATENT DOCUMENTS

| 3,853,283 | A | * | 12/1974 | Croce | .................... | B65H 75/48 |
| | | | | | | 119/796 |
| 6,799,994 | B2 | | 10/2004 | Burke | | |
| 7,207,296 | B2 | * | 4/2007 | DiDonato | ............ | A01K 27/004 |
| | | | | | | 119/794 |
| 7,866,282 | B2 | * | 1/2011 | Simpson | .............. | A01K 27/004 |
| | | | | | | 119/781 |
| 8,251,020 | B2 | * | 8/2012 | Matthews | ............ | A01K 27/004 |
| | | | | | | 119/796 |
| 8,558,688 | B2 | | 10/2013 | Henson et al. | | |
| 8,698,617 | B2 | | 4/2014 | Henson et al. | | |
| 8,698,618 | B2 | | 4/2014 | Henson et al. | | |

(Continued)

FOREIGN PATENT DOCUMENTS

| WO | 2015/112336 A1 | 7/2015 |
| WO | 2017/066114 A1 | 4/2017 |

OTHER PUBLICATIONS

Freedom LP3 brochure, MTI, Sep. 2009, 1 page.

(Continued)

*Primary Examiner* — Sang K Kim
*Assistant Examiner* — Nathaniel L Adams
(74) *Attorney, Agent, or Firm* — Thompson Coburn LLP

(57) ABSTRACT

A retractor for an anti-theft display includes a rotatable locking member that may hold the retractor's spool in fixed position against further rotation. The retractor's spool carries an anti-theft tether that normally extends or retracts as a tethered product is lifted to and from a retail display. The locking member holds the tether in fixed position.

9 Claims, 4 Drawing Sheets

(56) References Cited

U.S. PATENT DOCUMENTS

| | | |
|---|---|---|
| 8,955,807 B2 | 2/2015 | Alexander et al. |
| 9,092,960 B2 | 7/2015 | Wheeler |
| 9,097,380 B2 | 8/2015 | Wheeler |
| 9,437,088 B2 | 9/2016 | Phillips et al. |
| 9,443,404 B2 | 9/2016 | Grant et al. |
| 9,747,765 B1 | 8/2017 | Berglund et al. |
| 9,761,101 B2 | 9/2017 | Berglund et al. |
| 9,786,140 B2 | 10/2017 | Henson et al. |
| 9,805,564 B1 | 10/2017 | Berglund et al. |
| 9,811,988 B2 | 11/2017 | Grant et al. |
| 9,928,704 B2 | 3/2018 | Berglund et al. |
| 10,026,281 B2 | 7/2018 | Henson et al. |
| 10,043,358 B1 | 8/2018 | Berglund et al. |
| 10,068,444 B1 | 9/2018 | Berglund et al. |
| 10,078,945 B2 | 9/2018 | Grant et al. |
| 2013/0026322 A1 | 1/2013 | Wheeler et al. |
| 2013/0161054 A1 | 6/2013 | Allison et al. |
| 2015/0333454 A1 | 11/2015 | Henson et al. |
| 2016/0335859 A1 | 11/2016 | Sankey |
| 2018/0049563 A1 | 2/2018 | Henson et al. |

OTHER PUBLICATIONS

Freedom LP3 Product Manual, MTI, Mar. 2010, pp. 1-20.
Freedom LP3 Product Manual, MTI, Mar. 2011, pp. 1-25.
Freedom One Product Manual, MTI, Jun. 2011, pp. 1-32.
Freedom One Product Manual, MTI, Jun. 2012, pp. 1-32.
Freedom Universal 2.0 Product Manual, MTI, Dec. 2008, pp. 1-21.
Protex International Corp., "Instructions for PowerPro Detangler", 2005, 1 page.
Protex International Corp., "Instructions for PowerPro Sensor Head Cameras and Camcorders (Power and Security)", 2007, pp. 1-9.
Protex International Corp., "PowerPro System", 2006, pp. 1-2.
Propelinteractive, "MTI LP3 Product Mounting", YouTube Video https://www.youtube.com/watch?v=KX4TEuj1jCl, published on Jun. 23, 2010 (see sample screenshots, pp. 1-11).
U.S. Appl. No. 62/240,171, filed Oct. 12, 2015.
U.S. Appl. No. 62/297,215, filed Feb. 19, 2016.
U.S. Appl. No. 61/930,039, filed Jan. 22, 2014.
U.S. Appl. No. 61/939,954, filed Feb. 14, 2014.
U.S. Appl. No. 61/974,058, filed Apr. 2, 2014.

* cited by examiner

TETHER LOCK

TECHNICAL FIELD

The present disclosure relates to retail security or anti-theft devices for marketing consumer products.

BACKGROUND OF THE INVENTION

It is common to display consumer electronics (cell phones, tablet devices, etc.) in retail stores by mounting them to posts or similar structures on display countertops. The hand-held is typically tethered to the display. One common form of tethering involves cable reels or "retractors."

The present disclosure relates to a means for locking a retractor in place, from free rotation, while the retractor's cable or tether is retracted. Retractors in the anti-theft industry are often spring-loaded so that they naturally or automatically pull the cable back into the retractor's housing, after a consumer lifts and returns a tethered hand-held to and from the display. Sometimes, however, the retailer wants the tether "locked down" from extension from the retractor. Because the tether may be the only physical attachment between the product and a display base, an extended tether offers something that is easy to cut by a thief in the store. Locking the tether in retracted mode keeps the product close to the base, but with the tether shielded or in a wound condition such that it is not easy to access for cutting.

As described below, the present disclosure provides a lock-down mechanism that accomplishes the above function.

SUMMARY OF THE INVENTION

This disclosure involves a retractor for an anti-theft display that can be locked into a fixed position that prevents rotation of the retractor. The retractor can be locked at any point of extension or retraction (i.e., extension or retraction of the anti-theft tether that is part of the retractor).

The retractor comprises a spool apparatus that carries the anti-theft tether. The spool apparatus normally has an internal tether spool that rotates freely in either clockwise or counter-clockwise directions. The spool apparatus includes a portion with a circular periphery that rotates in response to winding or unwinding movement of the tether.

The retractor further includes a rotatable lock member that is carried by the spool apparatus. The lock member may rotate between "lock" or "unlock" positions. The lock member carries a projecting portion that is shaped and positioned relative to the circular periphery of the spool apparatus, in a manner so that the projecting portion mechanically engages with the circular periphery, when the lock member is rotated into the "lock" position.

In one form, the circular periphery consists of a uniform distribution of teeth. The projecting portion described above has a point that engages with the teeth, when the lock member is in "lock."

Mechanical engagement of the lock member with the circular periphery prevents winding or unwinding of the tether. Further details of the foregoing summary are described below, which should be taken in conjunction with the accompanying drawings.

BRIEF DESCRIPTION OF THE DRAWINGS

In the drawings, like reference numerals and letters refer to like parts throughout the various views, and wherein.

BEST MODE OF THE INVENTION

Figure 1:
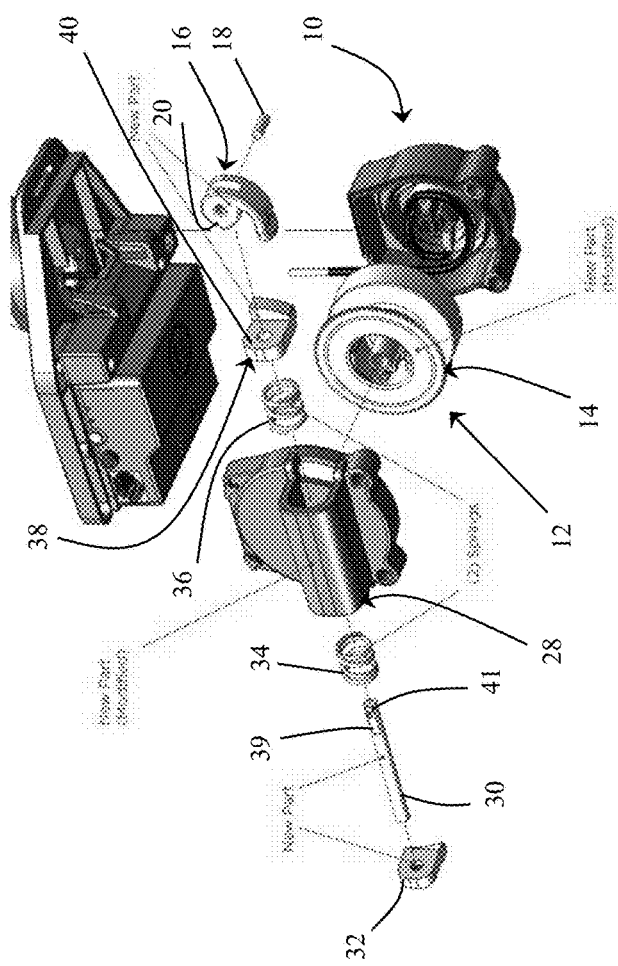
FIG. 1 is an exploded, pictorial view of a retractor mechanism and shows the location of a lock-down arm relative to the retractor.
Figure 2:
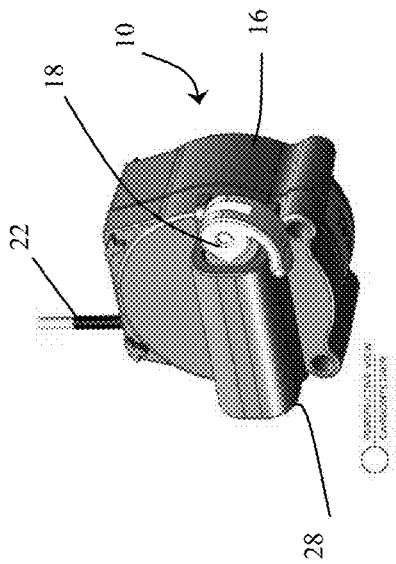
FIG. 2 is an unexploded view of the retractor portion of FIG. 1.
Figure 3:
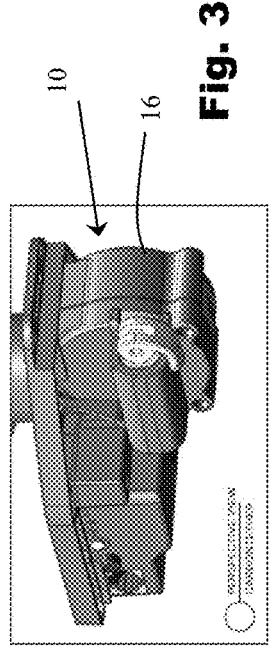
FIG. 3 is an unexploded view of FIG. 1.

Referring briefly to the drawings, arrow 10 generally refers to a retractor that is used in connection with a retail anti-theft display. In this case, the retractor 10 has a spool 12 for winding or unwinding the retractor's tether cable 22 (for tether retraction or extension). The spool 12 has teeth around its outer periphery (best seen at 14 in FIGS. 6 and 7).

A lever or lock arm 16 is mounted for rotation about a pin 18 (described later). While the lock arm 16 may take many forms, it has a projecting portion 20 that is sized to engage a lock-down mechanism (described later) with the teeth 14 on the spool 12, when the lock arm 16 is "flipped down."

Figure 4:
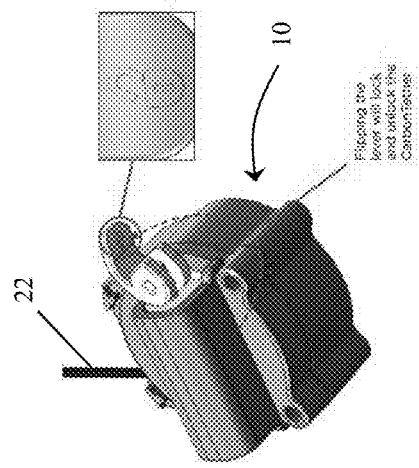
FIG. 4 is a view like FIG. 2, but taken from a different angle.
Figure 5:
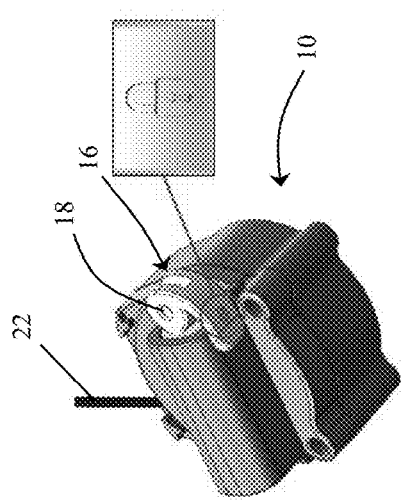
FIG. 5 is a view like FIG. 4, but shows the lock-down arm flipped up for disengaging or unlocking the retractor's tether.

Referring now to FIGS. 4-7, the lock arm 16 may be flipped back and forth between the position shown in FIGS. 4 and 5, respectively, depending on whether it is desired to lock or unlock the spool 12 and cable 22. In essence, the lock arm 16 is designed to have a type of camming/locking action, further described below. When in the position shown in FIGS. 4 and 6, for example, the lock arm 16 is flipped "down" so that the teeth 14 on spool 12 are engaged. This, in turn, locks the spool against rotation and holds the retractor cable 22 in place, locking it from further extension or retraction.

Figure 7:
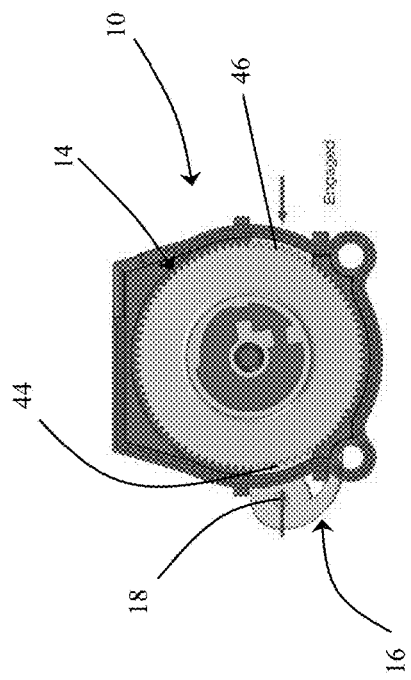
FIG. 7 is a view like FIG. 6, but shows the lock-down arm disengaged.
Figure 8:
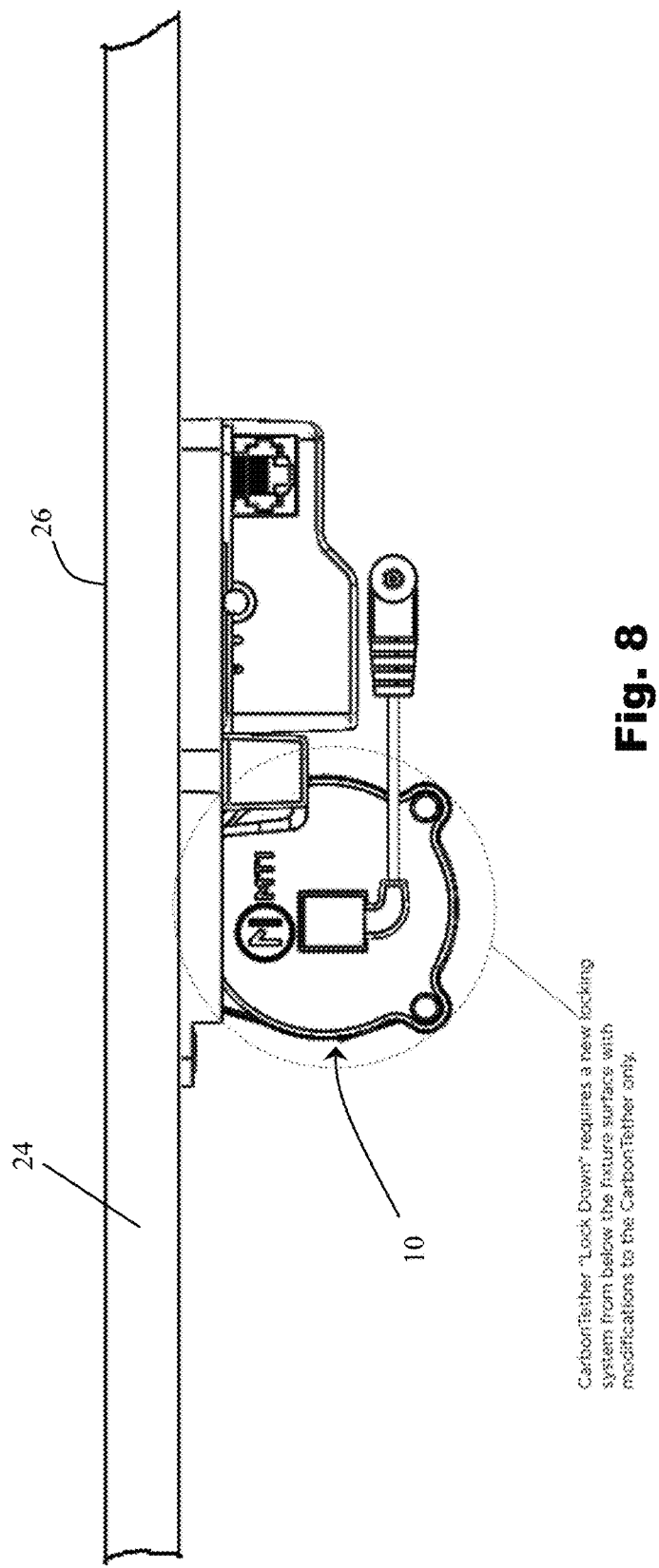
FIG. 8 is an unexploded side view of the mechanism shown in FIG. 1, and also illustrates mounting of the mechanism to the underside of a shelf.
Figure 10:
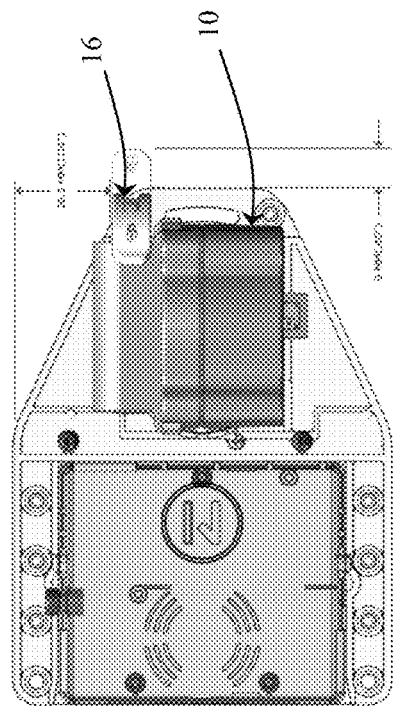
FIG. 10 is a bottom view of the mechanism shown in FIGS. 1, 3, 8, and 9.
Figure 9:
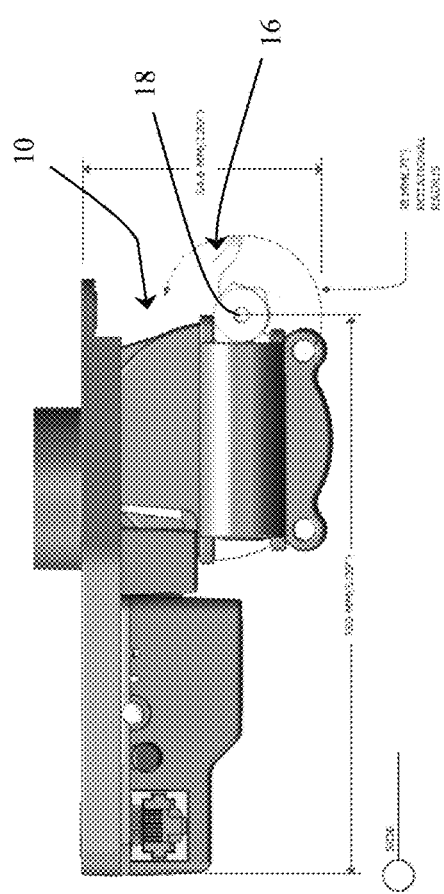
FIG. 9 is a view similar to FIG. 8.

As mentioned above, it is likely the lock arm 16 will be used when the cable 22 is fully retracted, to hold the product (not shown) against a mounting shelf (item 24 in FIG. 8) or a product-mounting base (not shown) that is on the upper surface 26 of the shelf 24. Flipping the lock arm 16 the other way is shown in FIGS. 5 and 7, for unlocking the spool 12 and allowing the cable 22 to extend and retract normally.

Directing attention back to FIG. 1, the specific structural features of the lock-down mechanism will be further described. First, the retractor 10 is modified to include an outer housing 28 that contains the parts for enabling the lock arm 16 to lock or unlock the retractor 10. Specifically, a rod 30 extends through housing 28. A first part 32 is on one end of the rod 30. Another part 38 is on the other end of the rod 30. Springs 34, 36 surround the rod 30. The second part 38 can slide back and forth on the region indicated by arrow 39 in FIG. 1. It has a flat surface 40, and a second surface portion. The latter carries an array of teeth 44 (see, FIG. 6). The lock arm 16 is connected to the end of rod 30 by pin 18 (via bore 41 in the rod).

Figure 6:
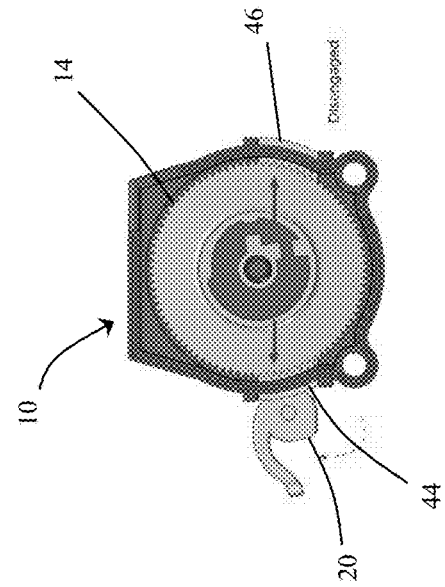
FIG. 6 is a side view of the retractor shown in FIGS. 2, 4, and 5, but with the outer cover removed, and the lock-down arm flipped down, for locking the retractor.

During the locking action, as the lock arm 16 is pivoted into the position shown in FIG. 6, the projecting portion 20 of the lock arm 16 pushes directly against surface 40, pushing and sliding it inward on rod 30, against the bias of one of the springs 34, 36. This, in turn, moves and engages the teeth 44 on the second part 38 with the teeth 14 on the spool 12 (as shown in FIG. 6). At the same time, the lock arm 16 is pulling the end of the rod 30 through an opening in part 38. This also pulls the other part 32 inward (on the other end of rod 30), also against the bias of one of the springs 34, 36. Like part 38, the other part 32 has an array of teeth 46 that engage with the spool teeth 14, but on the other side of the spool 12. As a consequence, the spool 12 is caught within a clamping jaw, created by natural inward movement of parts 38 and 32, caused by the camming action of lock arm 16.

When the lock arm 16 is flipped back or open (the position shown in FIGS. 5 and 7), the projecting portion 20 on the lock arm 16 rotates away from the flat surface 40, on the second part 38. This, in turn, allows the compressive forces in springs 34, 36 to push parts 38 and 32, and their respective teethed portions 44, 46 outwardly and away from wheel 14, thus disengaging with the teeth 14 on the wheel, and allowing the spool 12 to rotate normally for cable extension and retraction.

The foregoing is not intended to limit the scope of patent coverage. Patent coverage is to be limited only by the following patent claim or claims, the interpretation of which to be made by the established doctrines of claim interpretation.

What is claimed is:

1. A retractor for an anti-theft display, comprising:
a spool apparatus for carrying an anti-theft tether, said spool apparatus including a portion with a circular periphery that rotates in response to winding or unwinding movement of said anti-theft tether; and
a lock member adapted to engage with the spool apparatus to controllably lock and unlock winding and unwinding movement of said anti-theft tether, wherein said lock member comprises (1) a lock arm that is rotatable between a locked position and an unlocked position, (2) a projecting portion connected to said lock arm, (3) a clamp, (4) a rod, and (5) a spring that biases said clamp to mechanically disengage with and unlock said circular periphery to permit winding or unwinding movement of said anti-theft tether when said lock am is in said unlocked position;
wherein said lock arm, said projecting portion, and said clamp are adapted to provide a camming action that (1) translates a first rotational movement of said lock arm that causes said projecting portion to engage with and linearly move said clamp so that (i) said clamp mechanically engages with and locks said circular periphery against further rotation to thereby prevent winding or unwinding movement of said anti-theft tether and (ii) said clamp places a compressive force on said spring when said lock arm is in said locked position, and (2) translates a second rotational movement of said lock arm and said connected projecting portion into a linear movement of said clamp so that said clamp mechanically disengages with and unlocks said circular periphery to permit winding or unwinding movement of said anti-theft tether;
wherein said rod is connected to said lock arm such that said rod moves linearly in response to the first and second rotational movements of said lock arm, wherein said clamp is connected to said rod, and wherein said spring surrounds a portion of said rod; and
wherein said clamp comprises:
a first part connected to a first portion of said rod; and
a second part connected to a second portion of said rod, wherein said second part is slidingly engaged with said rod; and
wherein said first and second parts are adapted to mechanically engage with and disengage with opposite sides of said circular periphery in response to the first and second rotational movements respectively.

2. The retractor of claim 1 wherein said spring comprises:
a first spring adjacent said first part; and
a second spring adjacent said second part;
wherein said first and second springs bias said first and second parts respectively to mechanically disengage with and unlock said circular periphery to permit winding or unwinding movement of said anti-theft tether when said lock am is in said unlocked position.

3. The retractor of claim 1 wherein said second part includes a hole, and wherein said rod extends axially through said hole.

4. The retractor of claim 3 wherein said rod includes a region over which said second part slides in response to the linear movements caused by the first and second rotational movements.

5. The retractor of claim 1 wherein said circular periphery comprises a plurality of teeth, wherein said first part comprises a plurality of teeth, wherein said second part comprises a plurality of teeth, and wherein said mechanical engagement comprises an interlocking between said teeth of said circular periphery, said first part, and said second part.

6. The retractor of claim 1 further comprising a housing and a pin connected to said housing;
wherein said lock arm includes a hole;
wherein said pin extends through said lock arm hole so that said lock arm is rotatable about said pin; and
wherein said spool apparatus and a portion of said lock member are inside said housing, and wherein said lock arm extends outside said housing to permit a user to apply rotational forces to said lock arm, and wherein the first and second rotational movements are in opposite directions.

7. The retractor of claim 1 wherein said lock member is adapted engage with the spool apparatus to controllably lock winding and unwinding movement of said anti-theft tether at any point of extension and retraction for said anti-theft tether.

8. The retractor of claim 1 further comprising a product-mounting base, said product-mounting base and said anti-theft tether adapted to securely hold a product.

9. The retractor of claim 1 wherein said lock arm is adapted to be flipped down and flipped up, wherein the first rotational movement of said lock arm and said connected projecting portion is caused by said lock arm being flipped down, and wherein the second rotational movement of said lock arm and said connected projecting portion is caused by said lock arm being flipped up.

* * * * *